US006367313B1

(12) United States Patent
Lubyk

(10) Patent No.: US 6,367,313 B1
(45) Date of Patent: Apr. 9, 2002

(54) TEST PLUG

(76) Inventor: William M. Lubyk, 85 Feero Dr., Whitecourt, Alberta (CA), T7S 1E7

( * ) Notice: Subject to any disclaimer, the term of this patent is extended or adjusted under 35 U.S.C. 154(b) by 0 days.

(21) Appl. No.: 09/729,309

(22) Filed: Dec. 5, 2000

(51) Int. Cl.$^7$ .......... G01M 3/28; G01M 3/04; F16L 55/10; B23P 11/00; B21D 26/02
(52) U.S. Cl. .......... 73/49.8; 138/90; 138/89; 73/46; 73/49.5
(58) Field of Search .......... 73/49.8, 46, 49.1, 73/49.5; 138/89, 90, 93

(56) References Cited

U.S. PATENT DOCUMENTS

| 4,018,272 A | * | 4/1977 | Brown et al. ............... 166/119 |
| 4,159,564 A | * | 7/1979 | Cooper, Jr. .................. 29/727 |
| 4,382,379 A | * | 5/1983 | Kelly ............................. 73/46 |
| 4,393,674 A | * | 7/1983 | Rasmussen .................... 72/61 |
| 4,452,070 A | * | 6/1984 | Kipp ............................ 73/49.8 |
| 4,708,202 A | * | 11/1987 | Sukup et al. ............... 166/123 |
| 4,723,440 A | * | 2/1988 | Bernshausen ................. 73/40 |
| 4,802,273 A | * | 2/1989 | Widart ...................... 29/421.1 |
| 4,817,671 A | | 4/1989 | Mathison et al. ........... 138/89 |
| 4,827,984 A | * | 5/1989 | Young et al. ............... 138/93 |
| 4,887,646 A | * | 12/1989 | Groves ....................... 138/90 |
| 4,901,551 A | * | 2/1990 | Widart ......................... 72/58 |
| 5,024,079 A | | 6/1991 | Dufort ....................... 73/49.8 |
| 5,065,617 A | * | 11/1991 | Joelke et al. ............... 73/49.8 |
| 5,307,841 A | * | 5/1994 | Condon ....................... 138/90 |
| 5,797,431 A | | 8/1998 | Adams ........................ 138/89 |
| 5,844,127 A | | 12/1998 | Berube et al. .............. 73/49.8 |
| 5,918,638 A | | 7/1999 | Davis .......................... 138/89 |
| 6,035,898 A | | 3/2000 | Dominguez ................. 138/89 |
| 6,131,441 A | * | 10/2000 | Berube et al. .............. 73/49.8 |

FOREIGN PATENT DOCUMENTS

| CA | 43457 | 5/1946 |
| CA | 904772 | 7/1972 |
| CA | 1124549 | 6/1982 |
| CA | 1176189 | 10/1984 |
| CA | 1312557 | 1/1993 |
| CA | 2145792 | 9/1996 |
| WO | WO 96/23284 | 1/1996 |

* cited by examiner

Primary Examiner—Hezron Williams
Assistant Examiner—David J. Wiggins
(74) Attorney, Agent, or Firm—Bennett Jones LLP

(57) ABSTRACT

A test plug for testing the integrity of a pipe includes a blind flange for mating with a pipe flange, a compression mandrel having a conical recess, an expander having a conical surface which mates with the compression mandrel and an elastomeric annular seal positioned between the compression mandrel and the expander. Removeable compression rings of different sizes may be attached to the test plugs and used with different sizes of annular seals. The expander is actuated by a rod which extends through the compression mandrel and to the exterior of the test plug. Installation of the test plug isolates and seals an end portion of the pipe. Fluid under pressure may then be pumped into the isolated segment to test for pressure integrity.

7 Claims, 2 Drawing Sheets

:

TEST PLUG

FIELD OF THE INVENTION

The present invention relates to a test plug for testing the integrity of a pipe.

BACKGROUND OF THE INVENTION

Test plugs are used to isolate lengths of a pipe to test the integrity of the pipe or of welds or flanged connections within the length of pipe being tested. Conventional prior art test plugs use elastomeric seals which are compressed to seal the test plug against the inside surface of the pipe. In one example, in Canadian Patent No. 1,312,557, the elastomeric seal is cylindrical and is compressed from both ends to force the seal to bulge outwards. In U.S. Pat. No. 5,844,127, the elastomeric seals are O-rings which are circular in cross-section. The O-rings are squeezed between outwardly bevelled surfaces to force the O-ring to bulge outwards.

One difficulty with prior art test plugs is the need for a wide assortment of plugs for varying diameters of pipe. A single test plug cannot accommodate a wide variety of pipe diameters because the test plug must have sufficient clearance to be inserted into the pipe and can only expand to a certain size, beyond which a tight seal does not form.

As well, test plugs with elastomeric seals cannot be used with high pressure testing because of the limited grip of the seal against the inside of the pipe. Other prior art test plugs solve this problem with the use of metal dogs which grip the pipe, such as those disclosed in Canadian Patent No. 1176189. Metal dogs however can damage the inside surface of the pipe.

Therefore, there is a need in the art for an improved test plug which mitigates the difficulties of the prior art.

SUMMARY OF THE INVENTION

The present invention is directed to a test plug apparatus for sealing the inside of a pipe for isolating or testing the integrity of a portion of the pipe. In one embodiment, the apparatus comprises:

(a) a blind flange for mating with a flange attached to a proximal end of the pipe, said blind flange having a threaded inner bore;

(b) a positioner comprising:
  i. an inner bore, a proximal end and a distal end;
  ii. a hydrotest port in the proximal end which provides fluid communication of a pressring floid through the positioner; and
  iii. a threaded exterior surface which engages the inner bore of the blind flange;

(c) a compression mandrel having a proximal end, a distal end and an inner bore, wherein the proximal end engages the distal end of the positioner, the inner bore is continuous with the inner bore of the positioner, and the distal end comprises a conical recess and a removeable annular compression ring;

(d) an expander with core having a conical seal expanding surface and a removeable annular compression ring;

(e) means for actuating the expander positioned within the inner bore of the positioner and the compression mandrel; and (f) an elastomeric annular seal which is circumferentially mounted on the expander cone and positioned between the compression rings.

In one embodiment, the actuating means comprises an actuator rod having a proximal end and a distal end and a coupling sleeve, wherein said actuator rod passes through the inner bore of the positioner and the compression mandrel and said coupling sleeve is affixed to the distal end of the actuator rod and threadingly engages an expander shaft.

Preferably, the seal element and compression rings are chosen from a plurality of seal elements and compression rings having different outside diameters to match the inside diameter of the pipe to be tested.

In another embodiment, the invention comprises a test plug apparatus comprising a sealing mechanism comprising:

(a) a compression mandrel defining an internal bore and a conical recess and having a removeable compression ring;

(b) an expander element comprising a conical seal expander and a removeable compression ring, wherein said conical seal expander mates with the conical recess of the compression mandrel;

(c) an annular elastomeric seal which fits over the conical seal expander and between the compression rings;

(d) means for displacing the expander element relative to the compression mandrel;

(e) wherein the seal is expanded over the conical seal expander and compressed between the compression rings when the expander element is moved towards the compression mandrel.

The displacement means preferably, but not necessarily, comprises an actuator rod and a threaded coupling which is mounted to the actuator rod and which mates with an expander shaft which is attached to the expander element.

In another aspect of the invention, the invention comprises a method of pressure testing a pipe to which an end flange has been welded, comprising the steps of:

(a) providing test plug sealing assembly comprising a compression mandrel defining an internal bore and a conical recess and having a removeable compression ring; an expander element comprising a conical seal expander and a removeable compression ring, wherein said conical seal expander mates with the conical recess of the compression mandrel; an annular elastomeric seal which fits over the conical seal expander and between the compression rings; and means for displacing the expander element relative to the compression mandrel;

(b) mounting a positioner into a blind flange and mounting the sealing assembly to the positioner;

(c) mounting the blind flange to the end flange such that the sealing assembly is inside the pipe;

(d) actuating the seal by displacing the expander element;

(e) pressurizing the annular space between the sealing assembly and the pipe (the test space); with a pressurized test fluid and (f) checking for pressure integrity.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

Figure 1:
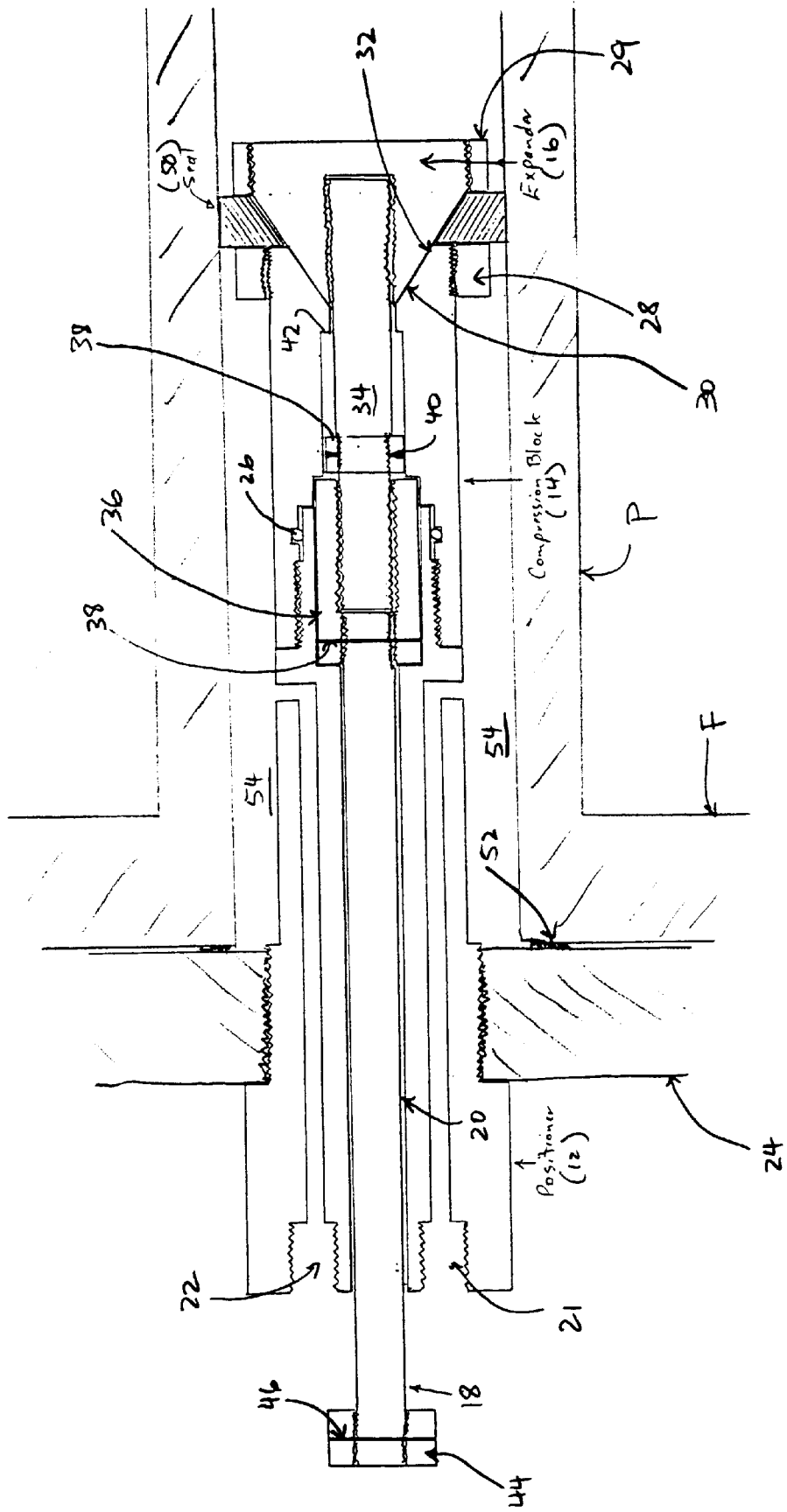
FIG. 1 is a cross-sectional view of one embodiment of the invention with the seal in an expanded, compressed state.
Figure 2:
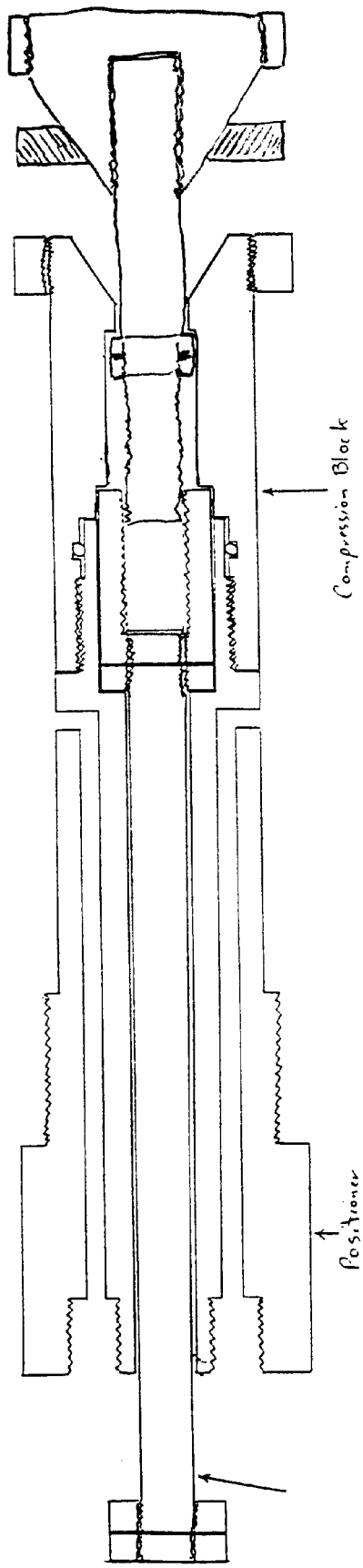
FIG. 2 is a cross-sectional view of one embodiment with the seal prior to expansion and compression.

The present invention provides for a test plug to test the integrity of a pipe. When describing the present invention, all terms not defined herein have their common art-recognized meanings. As used herein, "distal" or "distally" means a direction away from the end flange (F) of the pipe (P) to be tested while "proximal" or "proximally" means a direction towards the end flange (F).

The test plug (10) shown in the Figures comprises a positioner (12), a compression mandrel (14), an expander (16) and an actuator (18).

The positioner (12) defines a central bore (20) through which the actuator (18) may be inserted. The positioner (12) further defines testing ports (21, 22). The proximal end of the positioner is threaded externally to mate with a drilled and tapped hole in a blind flange (24). The distal end of the positioner (12) mates with the compression mandrel (14) by means of a threaded engagement. An O-ring seal (26) may be provided between the positioner (12) and the compression mandrel (14). In alternative embodiments, the positioner (12) and compression mandrel (14) may be a unitary piece.

The compression mandrel (14) supports a compression ring (28) which threadingly engages the exterior of the compression mandrel (14). The compression ring (28) has an inside diameter which matches the outside diameter of the compression mandrel (14). The compression ring (28) has an outside diameter which is chosen to be slightly less than the inside diameter of the pipe (P) to be tested. The compression mandrel (14) further comprises a central conical recess (30), the purpose of which will be apparent.

The expander (16) also supports a removeable compression ring (29) which threadingly engages the exterior of the expander (16). The expander compression ring (29) has an inside diameter which matches the outside diameter of the expander (16) and an outside diameter which is chosen to be slightly less than the inside diameter of the pipe (P) to be tested. The expander (16) further comprises a central conical surface (32) which mates with the conical surface (30) of the compression mandrel (14). The expander shaft (34) extends through the compression mandrel (14) and engages the distal end of the actuator (18) by means of a coupling sleeve (36) which is fixed to the actuator (18) by a locking pin (38). As is apparent, the expander (16) may be displaced distally or proximally by rotating the actuator (18). A guide nut (38) is positioned on the actuator (18) shaft and fixed with a locking pin (40). The guide nut (38) travels within a recess (40) within the compression mandrel (14) and stops excess movement distally by contacting a shoulder (42) formed within the compression mandrel (14).

The actuator (18) extends through the positioner (12) and the proximal end is adapted to be turned with a wrench or similar tool. In one embodiment, a hex drive nut (44) is fitted to the actuator (18) and locked with a locking pin (46).

An elastomeric seal (50) is positioned concentrically around the conical surface (32) of the expander (16), between the compression mandrel compression ring (28) and the expander compression ring (29). The seal (50) may preferably, but not necessarily, have a tapered inner surface which matches the conical surface (32) of the expander (16). The seal is then deformable by moving the expander (16) proximally towards the compression mandrel (14) and is then squeezed between the two compression rings (28, 29). The outside diameter of the undeformed seal (50) is chosen to be similar to the outside diameter of the compression rings (28, 29).

The outside diameter of the compression rings (28, 29) and seal (50) should be small enough to clear any internal restrictions of the pipe (P) inside diameter, such as a weld bead, but large enough to seal tightly when the seal (50) is expanded and compressed. The test plug (10) preferably is used with a plurality of different compression rings (28, 29) and seals (50) which have different outside diameters so that the test plug may be used with many different inside pipe diameters. The compression rings (28, 29) and seals (50) are easily installed on the test plug (10) prior to use.

In operation, the positioner (12), compression mandrel (14) and actuator (18) are assembled and installed into a blind flange (24) that matches the end flange (F) of the pipe (P) to be tested. A gasket (52) may be provided to seal between the blind flange (24) and the end flange (F). The appropriate compression rings and seal are chosen from a set of differently sized compression rings and seals for the given pipe schedule and mounted on to the compression mandrel (14) and expander (16). The blind flange (24) incorporating the test plug (10) is then mounted to the end flange of the pipe. The actuator (18) rod is then rotated to expand the seal outwards by the movement of the expander (16) and to compress it between the compression rings. Because the outside diameter of the seal (50) was chosen to be only slightly less than the inside diameter of the pipe and the seal (50) is supported by compression between the two compression rings, a very tight seal between the test plug and the pipe wall may be created.

The test pump (not shown) and pressure recording device (not shown) are attached to the test ports (21, 22) and test fluid is pumped through the position and into the annular space (54) between the positioner (12) and the pipe. As the test fluid is pumped into the test space through one port, air is vented out through the other port. The test space (54) is then pressurized to the desired pressure and the integrity of the end flange will be apparent from the detection of leaks or the loss of pressure once pressurized. The test space may then be depressurized and the actuator (18) rod rotated to move the expander (16) distally. The seal (50) will then decompress and release the pipe surface so that the test plug (10) may be removed.

As will be apparent to those skilled in the art, various modifications, adaptations and variations of the foregoing specific disclosure can be made without departing from the scope of the invention claimed herein.

What is claimed is:

1. An apparatus for sealing the inside of a pipe for isolating or testing the integrity of a portion of the pipe, said apparatus comprising:

(a) a blind flange for mating with a flange attached to a proximal end of the pipe, said blind flange having a threaded inner bore;
  (b) a positioner comprising:
    (i) an inner bore, a proximal end and a distal end;
    (ii) a hydrotest port in the proximal end which provides fluid communication of a pressuring fluid through the positioner; and
    (iii) a threaded exterior surface which engages the inner bore of the blind flange;
  (c) a compression mandrel having a proximal end, a distal end and an inner bore, wherein the proximal end engages the distal end of the positioner, the inner bore is continuous with the inner bore of the positioner, and the distal end comprises a conical recess and a removeable annular compression ring;
  (d) an expander core having a conical seal expanding surface and a removeable annular compression ring;
  (e) means for actuating the expander positioned within the inner bore of the positioner and the compression mandrel; and (f) an elastomeric annular seal which is circumferentially mounted on the expander cone and positioned between the compression rings.

2. The apparatus of claim 1 wherein the actuating means comprises an actuator rod having a proximal end and a distal end and a coupling sleeve, wherein said actuator rod passes through the inner bore of the positioner and the compression mandrel and said coupling sleeve is affixed to the distal end of the actuator rod and threadingly engages an expander shaft.

3. The apparatus of claim 1 wherein the seal element and compression rings are chosen from a plurality of seal elements and compression rings having different outside diameters to match the inside diameter of the pipe of the pipe.

4. A test plug apparatus comprising a sealing mechanism for sealing the inside of a pipe for isolating or testing the integrity of a portion of the pipe comprising:

(a) a compression mandrel defining an internal bore and a conical recess and having a removeable compression ring;

(b) an expander element comprising a conical seal expander and a removeable compression ring, wherein said conical seal expander mates with the conical recess of the compression mandrel;

(c) annular elastomeric seal which fits over the conical seal expander and between the compression rings;

(d) means for displacing the expander element relative to the compression mandrel;

(e) wherein the seal is expanded over the conical seal expander and compressed between the compression rings when the expander element is moved towards the compression mandrel.

5. The test plug apparatus of claim 4 wherein the displacement means comprises an actuator rod and a threaded coupling which is mounted to the actuator rod and which mates with an expander shaft which is attached to the expander element.

6. A method of pressure testing a pipe to which an end flange has been welded, comprising the steps of:

(a) providing a test plug sealing assembly comprising a compression mandrel defining an internal bore and a conical recess and having a removeable compression ring; an expander element comprising a conical seal expander and a removeable compression ring, wherein said conical seal expander mates with the conical recess of the compression mandrel; an annular elastomeric seal which fits over the conical seal expander and between the compression rings; and means for displacing the expander element relative to the compression mandrel;

(b) mounting a positioner into a blind flange and mounting the sealing assembly to the positioner;

(c) mounting the blind flange to the end flange such that the sealing assembly is inside the pipe;

(d) actuating the seal by displacing the expander element;

(e) pressurizing the annular space between the sealing assembly and the pipe (the test space) with a pressurized test fluid; and (f) checking for pressure integrity.

7. The method of claim 6 wherein the positioner defines two test ports which provide fluid communication between outside the pipe and the test space and the test space is pressurized by means of a pump attached to one test port and the pressure is recorded by means of a pressure guage attached to the other test port.

* * * * *